United States Patent
Prawitz et al.

(10) Patent No.: US 11,216,712 B2
(45) Date of Patent: Jan. 4, 2022

(54) ACQUIRING A BIOMETRIC PRINT BY MEANS OF A SMARTCARD

(71) Applicant: IDEMIA IDENTITY & SECURITY FRANCE, Issy-les Moulineaux (FR)

(72) Inventors: Nicolas Prawitz, Osny (FR); Olivier Latrille, Osny (FR); David Lucas, Osny (FR); Sébastien Douche, Osny (FR)

(73) Assignee: IDEMIA IDENTITY & SECURITY FRANCE, Issy-les Moulineaux (FR)

( * ) Notice: Subject to any disclaimer, the term of this patent is extended or adjusted under 35 U.S.C. 154(b) by 0 days.

(21) Appl. No.: 16/533,476

(22) Filed: Aug. 6, 2019

(65) Prior Publication Data
US 2020/0050911 A1 Feb. 13, 2020

(30) Foreign Application Priority Data

Aug. 7, 2018 (FR) ...................................... 1857353

(51) Int. Cl.
| | |
|---|---|
| *G06K 5/00* | (2006.01) |
| *G06K 7/08* | (2006.01) |
| *G06K 19/07* | (2006.01) |
| *G06K 9/00* | (2006.01) |
| *G06Q 20/34* | (2012.01) |
| *G06Q 20/40* | (2012.01) |

(52) U.S. Cl.
CPC ..... *G06K 19/0718* (2013.01); *G06K 9/00087* (2013.01); *G06Q 20/3563* (2013.01); *G06Q 20/40145* (2013.01)

(58) Field of Classification Search
CPC .......... G06F 21/32; G06F 21/34; G06F 21/77; G06Q 20/341; G06Q 20/3563;
(Continued)

(56) References Cited

U.S. PATENT DOCUMENTS

| | | | |
|---|---|---|---|
| 6,840,454 B1 * | 1/2005 | Rhelimi | G06K 19/07 235/492 |
| 6,959,874 B2 * | 11/2005 | Bardwell | G06K 9/00885 235/493 |

(Continued)

FOREIGN PATENT DOCUMENTS

| | | |
|---|---|---|
| EP | 1265121 A2 | 12/2002 |
| WO | 2004/025545 A2 | 3/2004 |
| WO | 2010/022129 A1 | 2/2010 |

OTHER PUBLICATIONS

Preliminary Search Report dated Jun. 4, 2019 in corresponding FR Application No. 1857353, 12 pages.

*Primary Examiner* — Tuyen K Vo
(74) *Attorney, Agent, or Firm* — MH2 Technology Law Group LLP

(57) ABSTRACT

Described is a system (SY) comprising a card (DV1) and a peripheral device (DV2) configured to cooperate together to enable a biometric print to be acquired. The smartcard (DV1) includes a biometric print sensor (10) and a control module for transmitting control signals (SG) to the peripheral device (DV2), each control signal (SG) being defined by a respective single level of an electrical characteristic. Apart from a possible internal power supply, the peripheral device (DV2) may include passive components only, including a user interface (20) configured to put itself into a predetermined state in response to each received control signal (SG), so as to guide a user in acquiring a biometric print by means of the biometric print sensor (10).

14 Claims, 4 Drawing Sheets

(58) Field of Classification Search
CPC ......... G06Q 20/40145; G06K 9/00006; G06K 19/07; G06K 19/0718; G06K 9/00087; G06K 9/00013
USPC ........................................ 235/380, 451, 492
See application file for complete search history.

(56) References Cited

U.S. PATENT DOCUMENTS

| | | | |
|---|---|---|---|
| 7,938,329 B2* | 5/2011 | Tran | G06K 7/0008 235/451 |
| 2005/0035200 A1* | 2/2005 | Hendrick | G06K 7/0021 235/441 |
| 2007/0040017 A1 | 2/2007 | Kozlay | |
| 2008/0223925 A1* | 9/2008 | Saito | G07F 7/1008 235/380 |
| 2011/0003491 A1* | 1/2011 | Levy | H01R 29/00 439/78 |
| 2011/0140841 A1* | 6/2011 | Bona | G07F 7/0846 340/5.83 |
| 2012/0318863 A1 | 12/2012 | Kim | |
| 2016/0203346 A1 | 7/2016 | Gardiner et al. | |
| 2017/0313110 A1* | 11/2017 | Kotik | B41J 29/38 |
| 2018/0276518 A1* | 9/2018 | Benkley, III | G06F 21/32 |
| 2019/0179438 A1* | 6/2019 | Benkley, III | G06K 9/001 |
| 2020/0013032 A1* | 1/2020 | Moskowitz | G06Q 20/3563 |

* cited by examiner

ACQUIRING A BIOMETRIC PRINT BY MEANS OF A SMARTCARD

CROSS-REFERENCE TO RELATED APPLICATIONS

This application claims priority to French Application No. 1857353 filed 7 Aug. 2018, which is hereby incorporated by reference in its entirety.

BACKGROUND OF THE INVENTION

The present invention lies in the general field of electronic devices, and more particularly it relates to acquiring a biometric print by using a smartcard. The invention seeks in particular to enable a user to be authenticated from a biometric print captured by a biometric print reader that is provided on a smartcard.

Smartcards (or "microcircuit" cards or "i/c" cards) are nowadays in widespread use in everyday life. By way of example, such cards are used as bank cards, loyalty cards, access cards, etc., and they can have various formats depending on their respective uses. Smartcards may also be designed to perform functions of various types, in particular in order to carry out transactions, such as bank transactions (payment, transfer, . . . transactions), authentication transactions, etc.

In known manner, a smartcard generally comprises a card body fitted with an electronic chip configured to process signals and to perform various functions depending on the intended use of the card. A smartcard is also provided with communication means enabling the electronic chip to interact with the outside, e.g. with an external terminal or reader.

Conventionally, a smartcard is designed to cooperate with an external terminal via contact areas that are accessible at the surface of the card. An external terminal can thus position appropriate contact pins on the contact areas of the card in order to establish communication by contact.

More recently, contactless smartcards have been increasingly successful because of the improvements in speed and simplicitly associated with contactless transactions. To do this, contactless cards include a radio frequency (RF) antenna enabling RF signals to be transmitted and received with an external terminal.

Constant efforts are being made in the smartcard industry in order to make secure the transactions that are carried out by their users. By way of example, the standardized protocol nowadays in majority use throughout the world for securing payment transactions effected by smartcards is known as the Europay MasterCard Visa (EMV) protocol.

A present trend consists in making transactions secure by means of biometric prints of users, and in particular by means of their fingerprints.

It is already known to fit a smartcard with a fingerprint sensor in order to enable its user to be authenticated. Nevertheless, acquiring fingerprints from such a reader embedded in a smartcard presents technical difficulties that need to be overcome in order to enable this new technology to become widespread.

Acquiring fingerprints on a smartcard can appear complicated or awkward to certain users, in particular those who are not familiar with this type of technology. It is therefore necessary to guide the user during the process of acquiring a fingerprint.

However, present-day smartcards generally do not include internal means for communicating directly with users, and they are therefore not capable of guiding them in the process of capturing a fingerprint.

Also, integrating ever more numerous and complex components in smartcards raises a problem, in particular in that the cards become more fragile and more exposed to failure. Smartcards, e.g. such as bank cards or access badges, generally need to present certain minimum characteristics, in particular in terms of mechanical strength and robustness.

An additional problem may result from the need to deliver electrical power to a fingerprint sensor embedded in a smartcard, since smartcards generally do not include an internal power supply.

There therefore exists at present a need for a solution that is simple and easy to use for enabling biometric prints (e.g. such as fingerprints) to be acquired by means of a smartcard, and to do so in particular without compromising the robustness and the mechanical characteristics of the smartcard.

In particular, it is desirable to guide users so that they can perform a biometric print capture easily by using a smartcard, without that requiring complicated modifications to present-day smartcards or in-depth knowledge on the part of users.

OBJECT AND SUMMARY OF THE INVENTION

To this end, the present invention provides a system comprising a smartcard and a peripheral device configured to cooperate together to enable a biometric print to be acquired, the smartcard and the peripheral device being separate from each other, the smartcard comprising:
  a biometric print sensor configured to acquire a biometric print; and
  a control module configured to transmit at least one control signal to the peripheral device, each control signal being defined by a respective single level of an electrical characteristic;
wherein, at least apart from a possible internal power supply, the peripheral device comprises passive components only, including:
  a user interface configured to put itself into a predetermined state in response to each received control signal, so as to guide a user in acquiring a biometric print by means of the biometric print sensor.

The invention is advantageous in that it provides a solution that is simple and easy to use for acquiring biometric prints from a smartcard, and in that it does so in particular without compromising the robustness and the mechanical characteristics of the smartcard. Specifically, the user interface is included in a peripheral device, which may advantageously be coupled with the smartcard in selective manner. The smartcard may be uncoupled from the peripheral device when there is no need for the peripheral device, thereby preserving the user interface from potential failures in the event of the smartcard suffering mechanical stresses (twisting, impacting, dropping, . . . ).

The invention makes it possible to guide users so that they can perform biometric print capture easily by using their smartcards, without that requiring complicated modifications to present-day smartcards or in-depth knowledge on the part of users.

In a particular implementation, in each predetermined state, the user interface is configured to present information appropriate for guiding a user in acquiring said biometric print by means of the biometric print sensor.

In a particular implementation, the electrical characteristic is one of the following: a voltage; a current; and a frequency.

In a particular implementation, the peripheral device does not include any active processor means capable of interpreting any command coming from the smartcard.

In a particular implementation, the smartcard comprises:
- a memory for storing said biometric print as a reference biometric print once it has been acquired by the biometric print sensor; and
- an authentication module configured to authenticate said user by comparing the reference biometric print with another biometric print that is acquired subsequently.

In a particular implementation, the smartcard comprises:
- a memory for storing said biometric print once it has been acquired by the biometric print sensor; and
- an authentication module configured to authenticate said user by comparing the acquired biometric print with print data previously stored as a reference biometric print.

The invention serves advantageously to authenticate a user by comparing an acquired biometric print with other print data, and to do so without any need to extract that data from the smartcard. The data representative of biometric prints captured by using the biometric print sensor may advantageously be stored in secure manner in a memory of the smartcard.

In a particular implementation, the peripheral device includes a battery for electrically powering the user interface.

In a particular implementation, the user interface is configured:
- to put itself in a first predetermined state in response to a first received control signal coming from the smartcard so as to indicate the start of a stage of acquiring a biometric print by the biometric print sensor;
- to put itself in a second predetermined state in response to receiving a second control signal coming from the smartcard so as to indicate that a biometric print is being acquired; and
- to put itself in a third predetermined state in response to a third control signal received from the smartcard so as to indicate that the stage of acquiring the biometric print has terminated;

wherein the first, second, and third control signals are distinct from one another.

In a particular implementation, the user interface is configured:
- to switch between two predetermined states at a first frequency in response to a series of first control signals received from the smartcard so as to indicate the start of a stage of acquiring a biometric print by means of the biometric print sensor;
- to switch between two predetermined states at a second frequency in response to a series of second control signals received from the smartcard so as to indicate that a biometric print is being acquired; and
- to put itself in a third predetermined state in response to a third control signal received from the smartcard so as to indicate that the stage of acquiring the biometric print has terminated;

wherein the first and second frequencies are distinct from each other, and the third signal is distinct from the first and second signals.

In a particular example, the first and second control signals are identical (same single level of an electrical characteristic) and they are transmitted at distinct transmission frequencies (in other words the first frequency and the second frequency are different from each other).

In a particular implementation, the user interface comprises a first LED and a second LED that are distinct from each other, the control module being configured to transmit to the peripheral device, as control signals:
- a ground voltage to switch on only the first LED among the two LEDs; or
- a voltage at a predetermined high level, higher than ground, to switch on only the second LED among the two LEDs.

In a particular implementation, the smartcard is a card having external contacts in compliance with the ISO 7816 standard in order to transmit each control signal to the peripheral device by contact.

In a particular implementation, the smartcard is configured to transmit each control signal via the external contact C4, C6, or C8 in the terminology of (according to) the ISO 7816 standard.

In a particular implementation, the smartcard is configured to transmit each control signal via a contact from among the external contacts C2, C3, and C7 in the terminology of (according to) the ISO 7816 standard, wherein the smartcard is configured to switch between:
- a first mode of operation in which the smartcard uses said one contact from among the external contacts C2, C3, and C7 in the terminology of the ISO 7816 standard in order to perform ISO 7816 type communication with an external terminal; and
- a second mode of operation in which the smartcard uses said one contact from among the external contacts C2, C3, and C7 in the terminology of the ISO 7816 standard for transmitting each control signal to the peripheral device;

the smartcard comprising:
- a verification module configured, on starting of the smartcard, to verify at least one signal level from among the signal RST detected on the external contact C2 in the terminology of the ISO 7816 standard, the signal CLK detected on the external contact C3 in the terminology of the ISO 7816 standard, and the power supply signal Vcc detected on the external contact C1 in the terminology of the ISO 7816 standard; and
- a configuration module configured to switch the smartcard either into the first mode of operation or else into the second mode of operation as a function of said at least one signal level detected from among the signal RST, the signal CLK, and the signal Vcc.

In a particular implementation, the smartcard is a payment card.

In a particular implementation, the peripheral device is a case into which the smartcard is inserted in order to enable said at least one control signal to be transmitted from the control module to the peripheral device.

In an embodiment, the invention is performed by means of software and/or hardware components. In this context, the term "module" as used in this document may correspond equally well to a software component or to a hardware component or to a combination of hardware and of software components.

A software component corresponds to one or more computer programs, one or more sub-programs of a program, or more generally to any element of a program or of software suitable for performing a function or a set of functions in the manner described in this document for the module in question.

Likewise, a hardware component corresponds to any hardware element suitable for performing a function or a set of functions in the manner described in this document for the module in question. It may be a hardware component that is programmable or that has an integrated processor for executing software, e.g. an integrated circuit.

The invention also provides a smartcard as defined above, configured to cooperate with a peripheral device in the meaning of the invention.

The invention also provides a corresponding control method performed by a system as defined above.

More particularly, the invention provides a control method performed by a system comprising a smartcard and a peripheral device cooperating together to enable a biometric print to be acquired, the smartcard and the peripheral device being separate from each other;
the smartcard including a biometric print sensor and the peripheral device comprising, at least apart from a possible internal power supply, passive components only, including a user interface;
wherein the method comprises:
acquiring a biometric print by means of the biometric print sensor;
transmitting at least one control signal from the smartcard to the peripheral device, each control signal being defined by a respective single level of an electrical characteristic; and
configuring the user interface into a predetermined state in response to each received control signal, so as to guide a user in acquiring a biometric print by means of the biometric print sensor.

It should be observed that the various embodiments defined above with reference to the system of the invention and the associated advantages apply in analogous manner to the control method of the invention. For each step of the control method, the system of the invention may comprise a corresponding module configured to perform said step.

The invention also provides a control method performed more specifically by the smartcard as defined above in the context of the control method performed by the system of the invention.

In a particular implementation, the various steps of the control method performed by the smartcard are determined by computer program instructions.

Consequently, the invention also provides a computer program on a data medium (or a recording medium), the program being suitable for being performed in a smartcard, the program including instructions suitable for performing steps of a control method as identified above.

The program may use any programming language, and it may be in the form of source code, object code, or code intermediate between source code and object code, such as in a partially compiled form, or in any other desirable form.

The invention also provides a data medium (or a recording medium) that is readable by a computer, and that includes instructions of a computer program as specified above.

The data medium may be any entity or device capable of storing the program. For example, the medium may comprise storage means, such as a read-only memory (ROM), for example a compact disk (CD) ROM, or a microelectronic circuit, or indeed magnetic recording means, e.g. a floppy disk or a hard disk.

Furthermore, the data medium may be a transmissible medium such as an electrical or optical signal that can be conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF SEVERAL EMBODIMENTS

Figure 1:
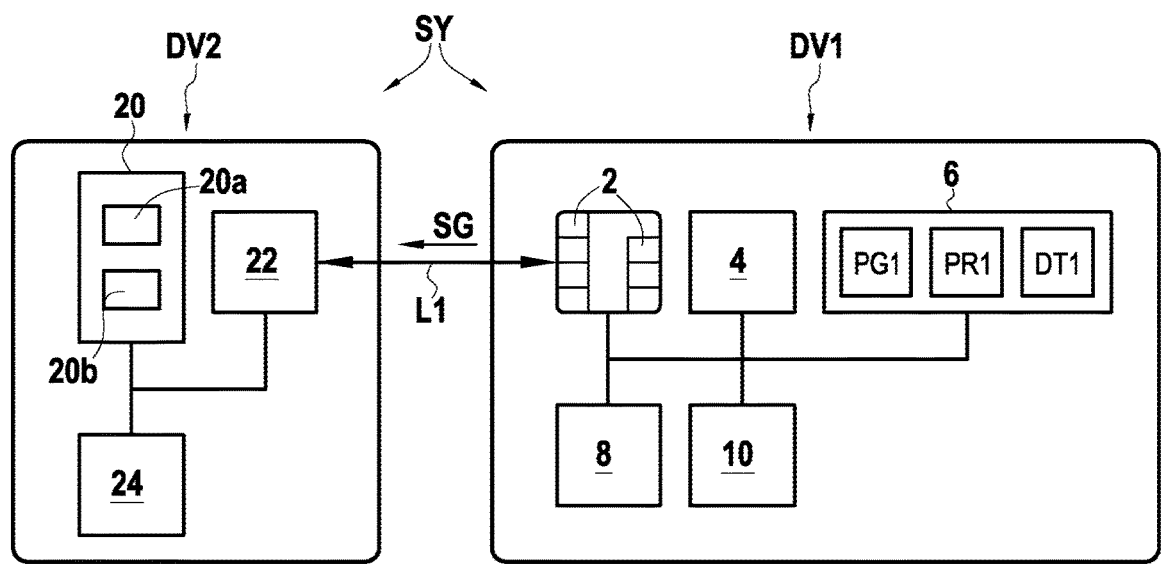
FIG. 1 is a diagram of a system comprising a smartcard and a peripheral device, in accordance with an embodiment of the invention.

The invention applies in general manner to acquiring biometric prints by means of a smartcard (or "microcircuit" card) having a biometric print sensor embedded therein. This acquisition stage, which may be performed at various moments, as explained below, may serve in particular to enable a user to be authenticated by means of a biometric print.

In this document, embodiments of the invention are described in the context of smartcards complying with the ISO 7816 standard, but other embodiments are nevertheless possible for smartcards that do not comply with the ISO 7816 standard.

Furthermore, the embodiments described below apply more particularly to the situation in which it is fingerprints that are acquired. As indicated below, the invention can be applied to biometric prints of other types.

The invention applies in particular to acquiring biometric prints by means of an EMV smartcard, i.e. a smartcard configured to process transactions using the EMV protocol. Nevertheless, other embodiments of the invention are possible without adopting the EMV protocol.

The invention applies in particular to smartcards such as bank cards or payment cards, but it also applies to any other appropriate type of smartcard, such as access cards, authentication cards, or loyalty cards, for example.

The invention sets out to guide a user in simple and effective manner during a stage of acquiring (or of capturing) one or more biometric prints by using a biometric print sensor embedded in a smartcard. To do this, the various embodiments of the invention make use of a system comprising both a smartcard and a peripheral device, these two elements are being separate from each other and being configured to be coupled together in order to enable one or more biometric prints to be acquired, while also guiding the user effectively during the process of capturing the print.

For this purpose, the smartcard has an embedded biometric sensor, while the peripheral device includes a user interface configured to be remotely controlled by the smartcard. When these two elements are coupled together, the smartcard is configured to transmit control signals to the peripheral device so that its user interface presents the user with useful information about capturing one or more biometric prints on the smartcard.

At least apart from a possible internal power supply, the peripheral device has passive components only, including the user interface, such that the control signals sent from the smartcard serve to control directly the state in which the user interface is to be found at any given instant.

The separable nature of the smartcard relative to the peripheral device presents the advantage that coupling between these two elements need be established only during a stage of acquiring one or more biometric prints. The peripheral device can be uncoupled from the smartcard, so as to enable the card to be used in other applications, e.g. such as performing a transaction or communication with an external terminal (e.g. of the ISO 7816 type).

By locating the user interface remotely in this way in a separable peripheral device, it is possible to ensure that the smartcard conserves good mechanical properties, in particular in terms of robustness and ability to withstand mechanical stresses (twisting, dropping, . . . ).

The invention also relates to the smartcard itself, to the peripheral device itself, and to a control method performed by each of those elements taken in isolation, and by the system taken as a whole.

As described below, the biometric print(s) acquired in the context of the invention may have several possible uses. During an initial acquisition stage (referred to as an "enrolment stage"), it may be necessary to capture at least one biometric print in order to acquire a reference biometric print that is to be compared with a subsequently-acquired print of the user in order to authenticate the user, e.g. in the context of a transaction that is being processed. In general, this enrolment stage is performed only once during an initial configuration (personalization) of the smartcard.

Furthermore, during an acquisition stage subsequent to the initial enrolment stage, the invention makes it possible to acquire a biometric print that can be compared with a biometric print previously stored in the smartcard as a reference print, in order to authenticate a user.

Other aspects and advantages of the present invention appear from embodiments described below with reference to the above-mentioned drawings.

Unless specified to the contrary, elements that are common or analogous in more than one of the figures carry the same reference signs and present characteristics that are identical or analogous, such that these common elements are generally not described again for reasons of simplicity.

Figure 2:
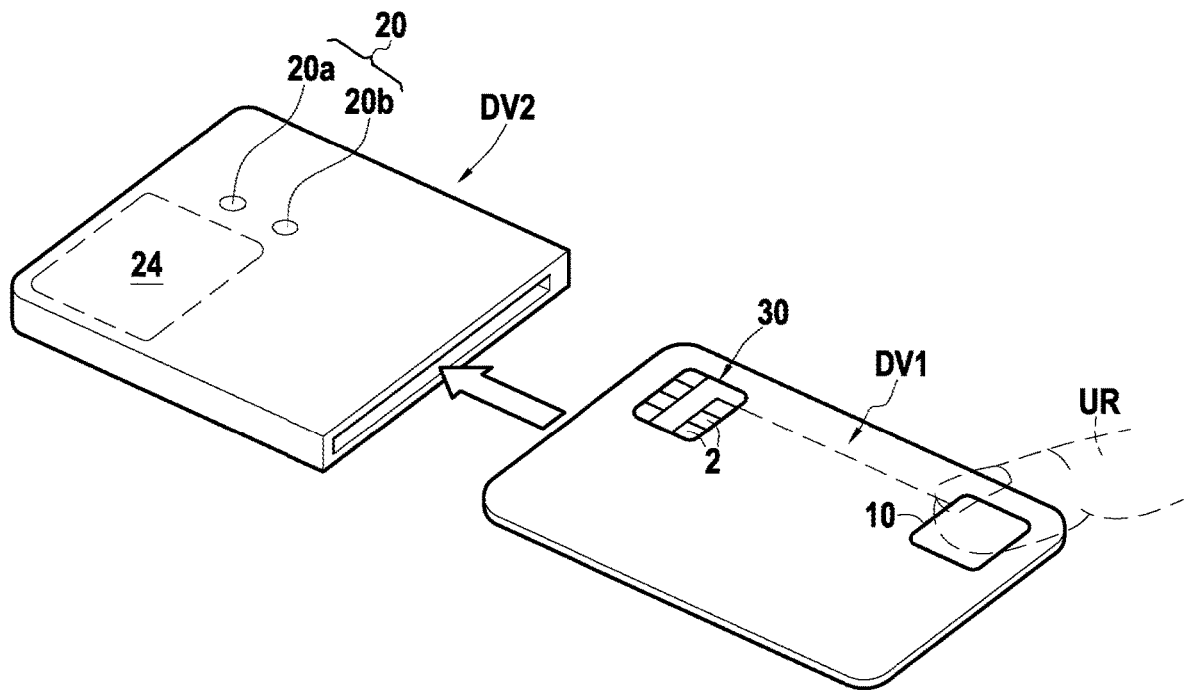
FIG. 2 is a more representational perspective view of a system in accordance with an embodiment of the invention, such as that shown in FIG. 1.

FIGS. 1 and 2 are diagrams showing the structure of a system SY that comprises both a smartcard DV1 and also a peripheral device DV2, these two elements being distinct (separate) from each other and configured to cooperate together, i.e. to be coupled to each other, in order to acquire a biometric print (and in this example a fingerprint).

The smartcard DV1 and the peripheral device DV2 may be coupled and uncoupled selectively, i.e. on request. The peripheral device DV2 may be releasably coupled to the smartcard DV1 when a user seeks to proceed with capturing a fingerprint.

The smartcard DV1 and the peripheral device DV2 may be coupled together in various ways, and in particular with or without contact depending on circumstances. In the present example, this coupling gives rise to a communication link L1 being set up between the smartcard DV1 and the peripheral device DV2, this link being a link with contact in the examples shown in FIGS. 1 and 2.

The peripheral device DV2 may be in various forms. FIG. 2 shows a non-limiting embodiment in which the peripheral device DV2 is in the form of a case having a slot into which the smartcard DV1 is inserted in order to establish coupling by contact. To do this, the case has a slot configured to receive the smartcard in such a manner that, once inserted, the smartcard can control the user interface of the case (as described below).

Nevertheless, other forms of coupling with or without contact are possible.

As shown in FIGS. 1 and 2, the smartcard DV1 in the present example has external contacts 2, a processor 4, a nonvolatile memory 6, a volatile memory or "random access memory" (RAM) 8, and a fingerprint sensor (or reader) 10.

In this example, the smartcard DV1 complies with the ISO 7816 standard, even though other examples are possible. By way of example, the smartcard DV1 is a payment card (or a bank card) of EMV or other type.

The external contacts (or contact areas) 2, which in this example comply with the ISO 7816 standard, constitute a communication interface enabling the smartcard DV1, and more particularly its processor 4, to transmit control signals SG by contact to the peripheral device DV2, in order to control its user interface 20 remotely.

As described below, at least one external contact (C1 to C8) in the terminology of the ISO 7816-2 standard may be used by the smartcard DV1 in order to transmit the control signal(s) SG to the peripheral device DV2. In this way, the smartcard DV1 can advantageously control the peripheral device DV2 without that requiring structural modifications to the smartcard DV1.

As mentioned above, the smartcard DV1 may alternatively cooperate with the peripheral device DV2 contactlessly, e.g. via a near-field communication (NFC) link. To do this, the smartcard DV1 may include a radio frequency (RF) antenna, which is not shown in the figures.

The memory 6 is a rewritable nonvolatile memory (e.g. of the flash type), this memory constituting a data medium (or recording medium) in accordance with a particular embodiment that is readable by the smartcard DV1 and that stores a computer program PG1 in accordance with a particular embodiment. The computer program PG1 includes instructions for executing steps of a control method, the steps being executed by the processor 4 of the smartcard DV1.

The nonvolatile memory 6 is also suitable for storing a fingerprint PR1 as acquired or detected by the fingerprint sensor 10 and also for storing fingerprint data DT1 representing a reference fingerprint with which the fingerprint PR1 is compared in order to authenticate a user UR (FIG. 2).

As mentioned above, the sensor 10 is configured to acquire (capture) a fingerprint. To do this, the sensor 10 is accessible from the surface of the smartcard DV1 so that a user can place a finger thereon and thus proceed with capturing a fingerprint.

In this document, the term "capturing (or acquiring) a fingerprint" is used to mean acquiring biometric data representative of a fingerprint. More generally, the term "capturing (or acquiring) a biometric print" is used to mean acquiring biometric data representative of this print.

In the example shown in FIG. 2, the smartcard DV1 includes an electronic module 30 that includes both the external contacts 2 that are accessible at the surface of the smartcard DV1 and also an electronic chip (not shown) having the processor 4 therein (FIG. 1). The processor 4 controls the fingerprint sensor 10 via an appropriate communication link (bus).

It should be observed that the smartcard DV1 does not have any user interface, so it does not have any means suitable for guiding a user UR during a stage of acquiring a fingerprint.

Furthermore, and as shown in FIGS. 1 and 2, the peripheral device DV2 in this example has a user interface 20, a communication interface 22, and optionally an internal power supply (or battery) 24.

Apart from an optional internal power supply (e.g. a battery), the peripheral device DV2 has passive components only, including the above-mentioned user interface 20. As is well known to the person skilled in the art, a component is said to be "passive" when it is not capable of increasing the power of a signal.

By way of example, a passive component may be a resistor, capacitor, a coil, a diode (e.g. a light-emitting diode (LED)), etc., and also any combination of such passive components.

In other words, in a particular example, the peripheral device DV2 does not include an internal power supply and therefore comprises passive components only, including the user interface 20.

In another example, the peripheral device DV2 includes at least one internal power supply (e.g. a battery). Under such circumstances, and ignoring the internal power supply(ies), the peripheral device DV2 comprises passive components only, including the user interface 20.

It follows that the peripheral device DV2 does not include any so-called "active" component (i.e. a component capable of increasing the power of a signal) other than one or more optional internal power supplies. In particular, the peripheral device DV2 does not include any active processor means capable of interpreting (in the software sense) any command coming from the smartcard.

In the examples considered herein, the peripheral device DV2 does not have a processor, nor does it have any memory.

As indicated below, it is thus possible to provide a user interface that is remote relative to the smartcard DV1, and to do so with minimum complexity concerning the resources needed to provide the peripheral device, and more generally the system in accordance with the principle of the invention.

The user interface 20 serves to guide a user UR during the stage of acquiring (or capturing) a fingerprint by means of the sensor 10 of the smartcard DV1. To do this, the user interface is configured to present, in any appropriate form, information that is useful for capturing a fingerprint by means of the sensor 10. The user thus knows what is going on during the stage of acquiring one or more fingerprints, and can easily determine what to do next.

In the context of the invention, the term "user interface" is used to mean any means or components suitable for presenting a user UR with information about capturing one or more biometric prints using the sensor 10. The information as provided in this way may be of a visual, audible, or vibratory nature, or it may be in any other appropriate form.

By way of example, the user interface 20 may include at least one indicator light, specifically two indicator lights 20a and 20b in the particular example shown in FIGS. 1 and 2. In this example, these indicator lights are LEDs. The indicator lights 20a and 20b, may be respectively red and green in color, for example, and they serve to display pertinent information to the user UR.

In a particular example, the user interface 20 may comprise a display screen suitable for displaying information serving to guide the user UR in taking a fingerprint on the sensor 10.

The peripheral device DV2 may optionally also include at least one control means (pushbutton, switch, detector, . . . ) enabling the user UR to send an instruction to the peripheral device DV2 and/or to the smartcard DV1 by means of the peripheral device DV2.

The communication interface 22 enables the peripheral device DV2 to receive at least one control signal SG transmitted by the smartcard DV1.

As described below, each control signal SG issued by the smartcard DV1 is defined by a single level of an electrical characteristic. In this example, the term "electrical characteristic" is used to mean any one of the following parameters: a voltage; a current; and a frequency. In other words, each control signal SG presents a single voltage level, a single current level, or a single frequency level. This single signal level is set by the processor 4 of the smartcard DV1 so as to cause predetermined information to be presented (by being displayed in this example) on the user interface 20 of the peripheral component DV2.

As mentioned above, the peripheral device 22 does not include a processor suitable for interpreting any command encoded in a computer language, as might come from the smartcard DV1. As described below in particular examples, the control signals SG issued by the smartcard DV1 may each be in the form of an analog pulse (of voltage, of current, or of frequency) in order to force the user interface 20 into a predetermined state.

In a particular example, the processor 4 transmits control signals SG in the form of voltage, current, or frequency modulation.

The user interface 20 is configured to take up a predetermined state in response to each received control signal SG, so as to guide a user UR in acquiring a fingerprint by means of the fingerprint sensor 10. In the presently considered example, each predetermined state of the user interface 20 corresponds to a global state [state of light 20a, state of light 20b] representative of combined states of the indicator lights 20a and 20b (each being on or off at a given instant).

For example, in one particular state of the user interface 20, the indicator light 20a is on, while the indicator light 20b is off. In another example of the state of the user interface 20, the indicator light 20a is off, while the indicator light 20b is on. In yet another example state of the user interface 20, both indicator lights 20a and 20b are on simultaneously.

In each predetermined state, the user interface 20 is configured to present corresponding information for guiding a user UR in acquiring a fingerprint by means of the fingerprint sensor 10. The user interface 20 may be configured to switch between different states, e.g. so as to alternate between a first state and a second state at a given frequency, for the purpose of presenting some particular information to the user. Implementations are described below.

By way of example, the user interface 20 can inform a user UR that a stage of acquiring a fingerprint has been initiated (thus inviting the user to place a finger on the sensor 10), can indicate that a fingerprint is being read, or indeed can indicate that a fingerprint has been acquired (thereby terminating the stage of acquiring the fingerprint).

In the example shown in FIGS. 1 and 2, each control signal SG has a direct effect on the (on/off) state of each indicator light 20a, 20b of the user interface 20, insofar as the peripheral device DV2 has passive components only (ignoring, as mentioned above, an internal power supply, if any). The peripheral device DV2 does not perform any software interpretation of the control signals since, as mentioned above, it does not have any processor.

As shown in FIGS. 1 and 2, the peripheral device DV2 may also include a battery 24 (or any other appropriate internal power supply) configured to provide the user interface 20, and possibly also the smartcard DV1, with electrical power, even though the presence of such a battery in the peripheral device DV2 is not essential. In another embodiment, and by way of example, it is the smartcard DV1 that includes an internal power supply (a battery) configured to provide electrical power to its own internal components (processor 4, sensor 10, . . . ) and also to the user interface 20 included in the peripheral device DV2. In another variant, both the smartcard DV1 and the peripheral device DV2 have respective internal batteries.

It should be observed that the system SY shown in FIGS. 1 and 2 constitutes merely one embodiment, and other embodiments are possible within the ambit of the invention. The person skilled in the art understands in particular that certain elements of the smartcard DV1 and of the peripheral device DV2 are not described in this document solely in order to make the invention easier to understand, since these elements are not required for performing the invention.

Figure 3:
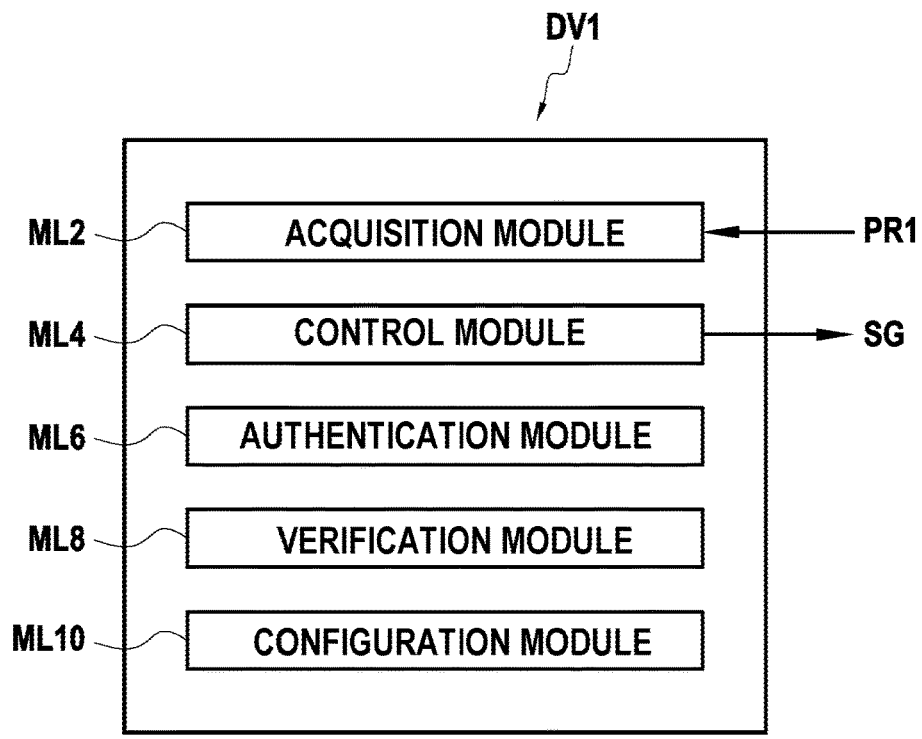
FIG. 3 is a diagram of the functional modules used by a smartcard forming part of a system of the invention, in a particular embodiment.

FIG. 3 is a diagram showing the functional modules implemented by the processor 4 under the control of the computer program PG1 in one particular embodiment, namely: an acquisition module ML2; a control module ML4; and optionally an authentication module ML6; a verification module ML8; and/or a configuration module ML10.

The acquisition module ML2 is configured to acquire (or to read) a fingerprint PR1 by using the fingerprint sensor 10. This fingerprint PR1 is in the form of biometric data representative of a fingerprint. To do this, the acquisition module can recover data measured by the sensor 10, and on the basis of the measured data, it can generate a fingerprint PR1 by any appropriate processing.

The memory 6 is suitable for storing the fingerprint PR1 as acquired in this way.

The control module ML4 is configured to transmit at least one control signal SG to the peripheral device DV2, in order to control the user interface 20 remotely. As mentioned above, each control signal SG issued by the control module ML4 is defined by a single level of an electrical characteristic (voltage, current, or frequency). In the example shown in FIGS. 1 and 2, the control signals SG are transmitted via the external contacts 2.

The authentication module ML6 is configured to authenticate a user by comparing the fingerprint PR1 as acquired by means of the sensor 10 with data for another fingerprint DT1. If a match is detected between the biometric data sets PR1 and DT1, the authentication is positive.

As indicated below, this other fingerprint DT1 may be acquired after the fingerprint PR1, such that the authentication module ML6 verifies the validity of this other fingerprint DT1 by comparing it with the fingerprint PR1 that is being used as the reference fingerprint.

In another example, this other fingerprint DT1 may be previously stored in the memory 6 as a reference fingerprint, prior to acquiring the fingerprint PR1. The authentication module ML6 then verifies the validity of the fingerprint PR1 by comparing it with the fingerprint DT1 that is being used as a reference.

On starting of the smartcard DV1, the verification module ML8 is configured to verify the level of a signal (e.g. RST or CLK) detected on a predetermined external contact 2 (e.g. C2 in the terminology of the ISO 7816 standard).

As described below in a particular embodiment, the configuration module ML10 is configured to switch the smartcard DV1 either into a first mode of operation or else into a second mode of operation, as a function of said signal level detected by the verification module ML8. Switching between these two modes of operation enables the smartcard DV1 to use a single external contact 2 for two different uses, namely: either for a conventional use, e.g. in order to implement ISO 7816 communication with an external terminal (e.g. as standardized in the ISO 7816-3 and/or ISO 7816-4 standards), or else for transmitting at least one control signal SG to the peripheral device DV2 using the principle of the invention so as to control the user interface 20 and thus enable a user to be guided during the process of capturing a fingerprint.

The operation and the configuration of the modules ML2 to ML10 of the smartcard DV1 appear more clearly from the embodiments described below.

It can be understood that the modules ML2 to ML10 as shown in FIG. 3 constitute merely one non-limiting embodiment of the invention.

Figure 4:
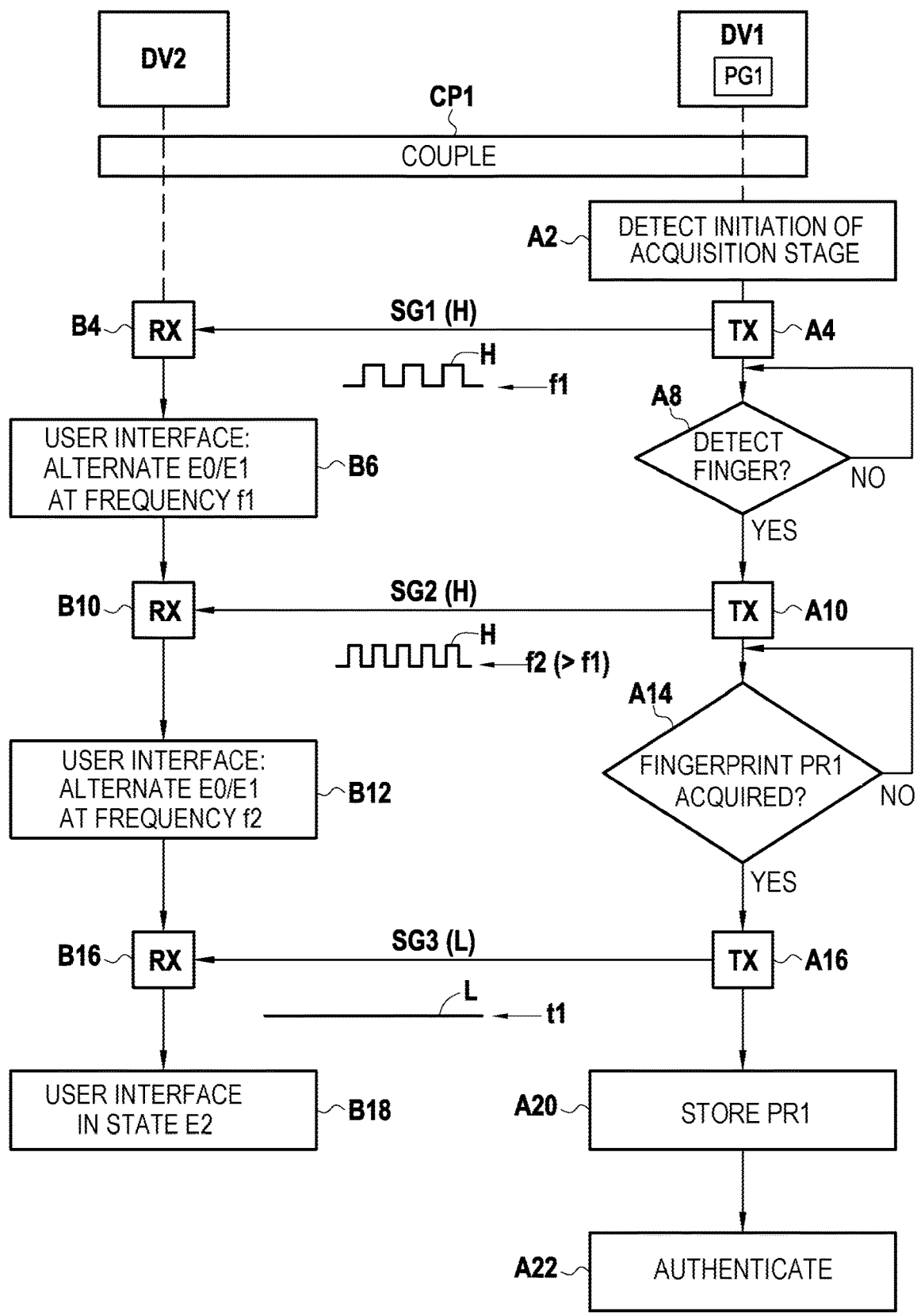
FIG. 4 is in the form of a flowchart, and it shows the steps of a control method implemented by a system of the invention in accordance with a particular embodiment.

With reference to FIG. 4, there follows a description of a control method in accordance with a particular implementation of the invention, and as performed by the system SY as described above with reference to FIGS. 1 to 3. More particularly, the smartcard performs a control method by executing the computer program PG1.

It is assumed that a user UR (FIG. 2) seeks to acquire a fingerprint using the sensor 10 embedded in the smartcard DV1. Such a capture may be necessary in particular in order to authenticate the user, e.g. during a transaction such as a payment transaction (of EMV or other type), or indeed in order to obtain access to a service or to a secure location.

During a preliminary step CP1, it is assumed that the smartcard DV1 and the peripheral device DV2 are coupled together so that they can cooperate in order to perform the control method of the invention. This coupling CP1 gives rise to a communication link L1 being established, in this example by contact, between the smartcard DV1 and the peripheral device DV2 (FIG. 1).

As shown in FIG. 2, it is assumed by way of example that the coupling takes place by inserting the smartcard DV1 into the peripheral device DV2, which in this example is in the form of a case. This coupling serves to put the external contacts 2 of the smartcard DV1 into contact with the communication interface 22 of the peripheral device DV2. As mentioned above, other types of coupling are nevertheless possible, and in particular contactless coupling.

During a detection step A2 (FIG. 4), the smartcard DV1 detects the initiation of a stage of acquiring a fingerprint. This detection may be the result of the coupling CP1 being established, or possibly it may be in response to some other predefined event.

Thereafter, the smartcard DV1 sends (A4) at least one first control signal SG1 to the peripheral device DV2. In this example, the smartcard DV1 sends (A4) a series of first control signals SG1, possibly in the form of voltage pulses, at a first transmission frequency, written f1. Each pulse (shown in the form of a squarewave in FIG. 4) presents the same peak voltage corresponding to a high level, written H (higher than ground). Each of the first control signals SG1 thus presents a single voltage level, written H, serving to force the user interface 20 into a first state E1, as described below.

The peripheral device DV2 receives the first control signals SG1 during a receive step B4. Each of the first control signals SG1 forces the user interface 20 into the above-mentioned first state E1. In this example, in the state E1, the user interface 20 is such that the first indicator light 20a is on while the second indicator light 20b remains off. During the periods of inactivity between receiving each first control signal SG1, the user interface 20 is in a rest state E0 in which both of the indicator lights 20a and 20b are off.

The user interface 20 thus responds (B6) by the first indicator light 20a flashing synchronously with the series of first control signals SG1 that are received in this example in the form of electrical pulses at the frequency f1, while the second indicator light 20b remains off.

In response to the first control signals SG1, the user interface thus switches between the state E0 and E1 at the first frequency f1 so as to indicate the beginning of a stage of acquiring a fingerprint by means of the fingerprint sensor 10. This alternation between the states E0 and E1 at the frequency f1 thus invites the user UR to place a finger on the sensor 10 in order to proceed with acquiring a fingerprint.

During a determination step A8, the smartcard DV1 determines whether it detects the presence of a finger on the sensor 10. If detection is successful, the method proceeds to the step A10 during which the smartcard DV1 transmits at least one second signal SG2 to the peripheral device DV2. In this example, the smartcard DV1 sends (A10) a series of second control signals SG2, possibly in the form of voltage pulses, at a second transmission frequency, written f2.

In this example, the second control signals SG2 are identical to the first control signals SG1 in the sense that these control signals all present the same single voltage level, however they are issued at different frequencies (f1≠f2). Nevertheless, other implementations are possible in which the first and second signals SG1 and SG2 are different such that they present different voltage levels.

Still in this example, the second frequency f2 is higher than the first frequency f1, although they could be the other way round. Each pulse (shown in the form of a squarewave in FIG. 4) presents the same peak voltage corresponding to the above-mentioned high level H. Each of the second control signals SG2 thus presents a single voltage level, written H, serving to force the user interface 20 into the above-described first predetermined state E1.

The peripheral device DV2 receives the second control signals SG2 during a receive step B10. Each of the second control signals SG2 forces the user interface 20 into the above-mentioned first state E1 (indicator light 20a on and indicator light 20b off). During the periods of inactivity between receiving each second control signal SG2, the user interface 20 is in a rest state E0 in which both of the indicator lights 20a and 20b are off.

The user interface 20 thus responds (B12) by the first indicator light 20a flashing synchronously with the series of second control signals SG2 that are received in this example in the form of electrical pulses at the frequency f2, while the second indicator light 20b remains off. Also, the indicator light 20a flashes at a frequency higher than the frequency of the flashing in step B6 (f2>f1).

In response to the second control signals SG2, the user interface 20 thus switches between the states E0 and E1 at the second frequency f2 so as to indicate that a fingerprint PR1 is being acquired. Alternating between the states E0 and E1 in this way at the frequency f2 thus invites the user UR to keep the finger in place on the sensor 10 so long as the fingerprint has not been captured completely.

During a determination step A14, the smartcard DV1 determines whether the fingerprint PR1 of the user UR has been acquired. More precisely, during this acquisition, the smartcard DV1 acquires biometric data representative of the fingerprint PR1. If the fingerprint PR1 has been acquired (A14), the method proceeds with sending step A16 during which the smartcard DV1 transmits at least one third signal SG3 to the peripheral device DV2. In this example, the smartcard DV1 sends (A16) a third control signal SG3 that is maintained for a predetermined time duration, written t1. In this example, this third control signal G3 is a ground signal, and thus presents a single low-voltage level written L, enabling the user interface 20 to be forced into a second predetermined state E2, as described below.

The peripheral device DV2 receives the third control signal SG3 during a receive step B16. This third control signal SG3 forces the user interface 20 into the above-mentioned second state E2. In this example, in the state E2, the user interface 20 is such that the first indicator light 20a is off while the second indicator light 20b is on. Given that the third control signal SG3 in this example is issued continuously during a time period t1, the indicator light 20b is kept on continuously during this time period t1.

In response to the third control signal SG3, the user interface 20 puts itself into (becomes configured in) the second predetermined state E2 so as to indicate that the stage of acquiring the fingerprint PR1 has terminated. This second state E2 thus invites the user UR to remove the finger from the sensor 10, and possibly to uncouple the smartcard DV1 from the peripheral device DV2.

In the presently described example, the signals SG transmitted to trigger each respective state of the user interface are different (since the states E1 and E2 differ from each other).

At the end of the sending step A16, the step of acquiring the fingerprint has ended.

The smartcard DV1 can then store (A20) the fingerprint PR1 as acquired in this way in its nonvolatile memory 6. This fingerprint PR1 can thus be consulted subsequently by the smartcard DV1 for a use that may vary depending on circumstances.

The smartcard DV1 can thus authenticate (A22) the user UR by comparing the fingerprint PR1 that has been acquired with another fingerprint. If the smartcard DV1 detects that the fingerprint PR1 matches the data of another print DT1, it determines that authentication of the user UR has taken place successfully.

More particularly, in a first particular example, the fingerprint PR1 is stored as a reference fingerprint in the memory 6 (step A20). Under such circumstances, the reference fingerprint PR1 is captured during an enrolment stage, e.g. during initial configuration (personalization) of the smartcard DV1. During the authentication step A22, the smartcard DV2 identifies the user UR (FIG. 2) by comparing the reference fingerprint PR1 with the other fingerprint DT1 acquired subsequently by using the sensor 10. The smartcard DV1 verifies the validity of the subsequent fingerprint DT1 by comparing it with the reference fingerprint PR1. The fingerprint PR1 can thus be used as a reference fingerprint for authenticating the user UR during subsequent uses of the smartcard DV1, e.g. during transactions, such as bank transactions (payment, transfer, . . . transactions) or authentication transactions.

In a second particular example, the fingerprint PR1 is stored during step A20 in the memory 6. Thereafter, the smartcard DV1 authenticates the user UR by comparing the acquired fingerprint PR1 with the print data DT1 previously recorded in the memory 6 as the reference fingerprint. Under such circumstances, the reference fingerprint DT1 may be acquired and stored by the smartcard DV1 during an enrolment stage prior to acquiring the fingerprint PR1.

The user could equally well use the invention for acquiring a plurality of fingerprints and/or for making a plurality of acquisitions of a single fingerprint. The steps A2 to A22 and B4 to B18 may thus be repeated with the user UR presenting one finger on each iteration. Thus, in a particular implementation, the smartcard DV1 may also send a fourth control signal SG to the peripheral device DV2 in order to put the interface 20 in a third predetermined state, e.g. so as to indicate the number of prints that have been recorded.

The invention is advantageous in that it provides a solution that is simple and easy to use for acquiring biometric prints from a smartcard, and in that it does so in particular without compromising the robustness and the mechanical characteristics of the smartcard. Specifically, the user interface is embedded in a peripheral device that may advantageously be coupled with the smartcard selectively, e.g. being coupled only when that is necessary for proceeding with an enrolment by capturing a biometric print. The smartcard may be uncoupled from the peripheral device when there is no need for the peripheral device, thereby preserving the user interface from potential failures in the event of the smartcard suffering mechanical stresses (twisting, impacting, dropping, . . . ).

The invention makes it possible to guide users so that they can perform a biometric print capture easily by using their smartcards, without that requiring complicated modifications to present-day smartcards or in-depth knowledge on the part of users.

In particular, an enrolment stage for acquiring a reference biometric print, e.g. during an initial configuration stage (personalization), may be found to be complicated or confusing, in particular if it requires a plurality of prints to be acquired in a specified sequence. The invention makes it possible to avoid the user being disturbed while such an enrolment stage is being performed by using a smartcard that includes a biometric sensor.

In a particular example, the peripheral device also includes a battery, enabling it to deliver electrical power to the interface, and possibly also to the smartcard DV1 when it is coupled to the peripheral device (with or without contact).

The invention serves advantageously to authenticate a user by comparing an acquired fingerprint with other print data, and to do so without any need to extract that data from the smartcard. The data PR1 and DT1 may advantageously be stored in a secure manner in a memory of the smartcard.

It should naturally be understood that the control signals SG1, SG2, and SG3 as described above with reference to FIG. 4 merely constitute non-limiting examples of the invention, with other configurations being possible in the context of the invention (for SG, and thus for the state of the user interface that is obtained in response).

In the embodiments described above with reference to FIGS. 1 to 4, the communication link L1 over which each control signal SG is transmitted is set up by contact via at least one external contact 2 of the smartcard DV1.

By way of example, by using an external contact as defined in the ISO 7816 standard, it is possible advantageously to use the present structure of the majority of the smartcards on the market, thereby avoiding structural modifications that would lead to practical difficulties (costs, leadtimes, . . . ).

Figure 5:
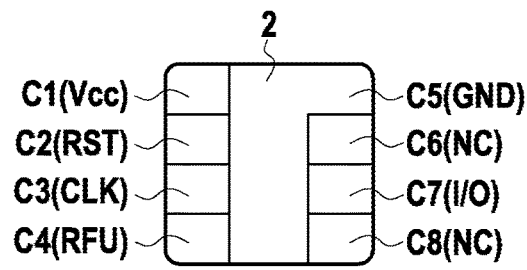
FIG. 5 shows a contact communication interface of a smartcard forming part of a system of the invention in accordance with a particular embodiment.

As shown by way of example in FIG. 5, the smartcard DV1 may be configured to make use of an external contact 2 in compliance with the ISO 7816-2 standard for transmitting each control signal SG to the peripheral device DV2.

In a first particular example, the smartcard DV1 is configured to transmit each control signal SG via the external contact C6 (in the terminology of the ISO 7816 standard), i.e. a contact for which use is left to the discretion of the manufacturer. For this purpose, it is also possible to use one of the contacts C4 and C8 in the terminology of the ISO 7816 standard.

In a second particular example, the smartcard DV1 is configured to transmit each control signal SG via the external contact C7 in the terminology of the ISO 7816 standard. Under such circumstances, the contact C7 may then have other uses, specifically: either a conventional use as an input/output contact, or else a use in application of the principle of the invention for transmitting control signals SG. It is then necessary for the smartcard DV1 to be capable of determining which use is to be made of the contact C7 at any given instant. To do this, the smartcard DV1 may be configured to switch between:

a first mode of operation MD1—referred to as a "transaction" mode—in which the smartcard DV1 uses the external contact C7 in the terminology of the ISO 7816 standard to perform all ISO 7816 type communication with an external terminal (not shown); and a second mode of operation MD2—referred to as a "print-acquisition" mode—in which the smartcard DV1 uses the external contact C7 in the terminology of the ISO 7816 standard for transmitting each of the control signals SG to the peripheral device DV2.

It should be observed that various configurations may be envisaged for enabling the smartcard DV1 to detect whether an enrolment stage (acquiring a fingerprint) is taking place, and thus to enable the smartcard DV1 to configure itself in the appropriate mode of operation.

Figure 6:
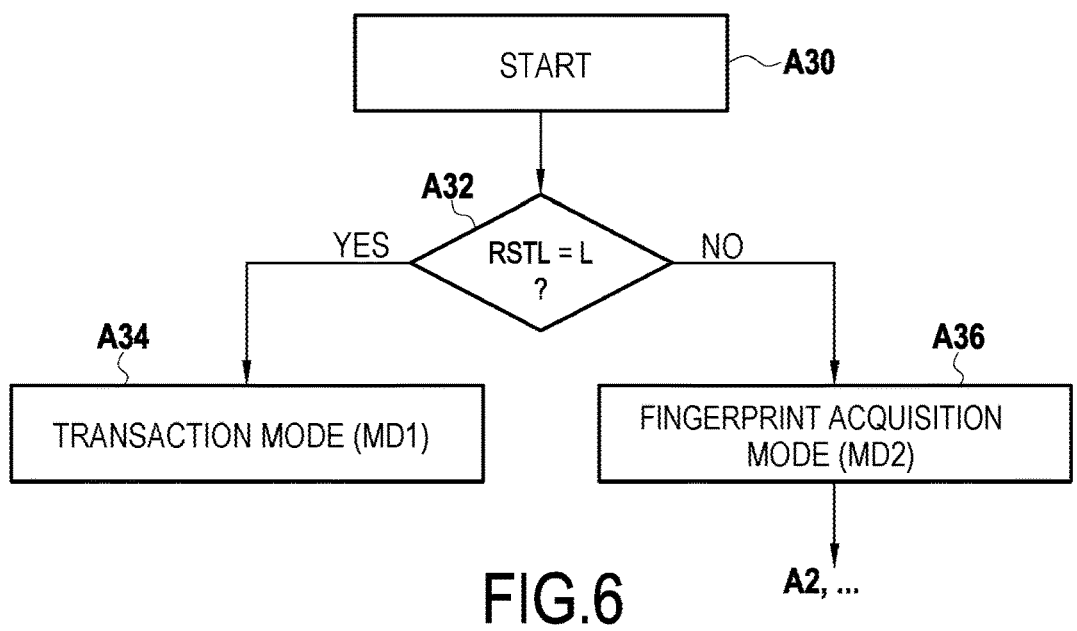
FIG. 6 is in the form of a flowchart, and it shows the steps of a control method performed by a smartcard forming part of a system of the invention, in accordance with a particular embodiment.

FIG. 6 shows a particular implementation of a control method performed by the smartcard DV1, and more generally by the system SY, in the second particular example above in which the smartcard DV1 is configured to use the contact C7 for transmitting the control signals SG to the peripheral device DV2.

More precisely, during a detection step A30, the smartcard DV1 detects that it has been started (or activated), i.e. that its processor 4 is powered.

In response to starting, the smartcard DV1 verifies (A32) the level of the signal RST (for "reset") as detected on the external contact C2 in the terminology of the ISO 7816 standard. More precisely, in this example, the smartcard DV1 determines (A32) whether the signal RST detected on the external contact C2 in the terminology of the ISO 7816 standard has reached a predetermined value written L.

According to the ISO 7816-3 standard, during activation of the smartcard DV1, the signal RST should theoretically be maintained at a low level for a predetermined duration (at least 400 clock cycles) while the smartcard is being powered via the external contact C1 (Vcc) in the terminology of the ISO 7816 standard.

Also, if the signal RST detected in A32 has a predetermined value L (low state in this example), then the smartcard DV1 configures itself (A34) in the transaction mode MD1 to enable the external contact C7 to be used in conventional manner. Otherwise (RST≠L), the smartcard DV1 configures itself (A36) in the print-acquisition mode MD2 to enable a fingerprint to be acquired in accordance with the principle of the invention. Once the print-acquisition mode MD2 has been activated, the smartcard DV1 can perform the control method as shown in FIG. 4 (A2, . . . ).

The smartcard DV1 thus switches either into the transaction mode MD1 or else into the print-acquisition mode MD2 as a function of the detected level of the signal RST on the external contact C2 in the terminology of the ISO 7816 standard.

The invention thus enables the smartcard DV1 to be effective in detecting the use that is to be made of the external contact C7 under circumstances in which it might be used in particular in the context of the invention.

In another example, the mode of operation (MD1 or MD2) may be selected in analogous manner by the smartcard, but on the basis of the signal level or of the frequency of said signal that is detected on the external contact C3 in the terminology of the ISO 7816 standard, which corresponds to the clock (CLK).

In another example, the mode of operation (MD1 or MD2) may be selected by the smartcard on the basis of the signal level on the external contact C1 in the terminology of the ISO 7816 standard, which corresponds to the power supply (Vcc).

In another example, each control signal SG may be transmitted in analogous manner via the external contact C2 and/or C3 in the terminology of the ISO 7816 standard. Under such circumstances, the contacts C2 and C3 may thus have other uses, namely: either a conventional use as an input contact, or else a use in application of the principle of the invention for transmitting control signals SG.

Figure 7:
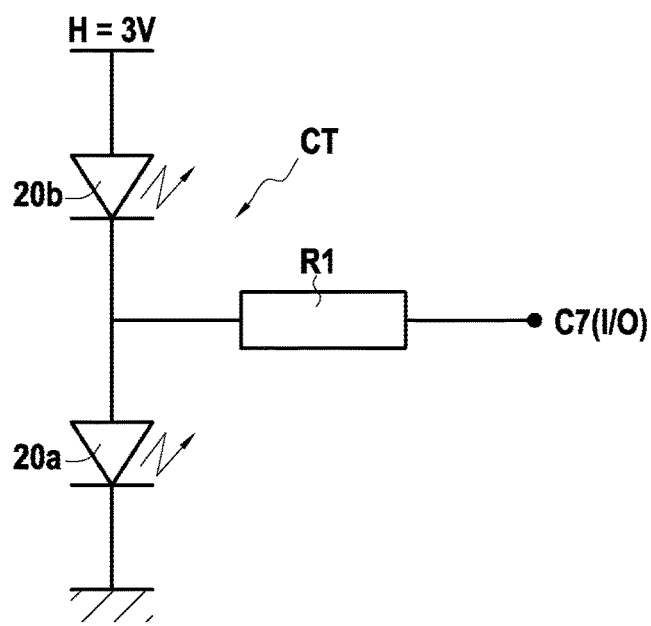
FIG. 7 is an electrical circuit diagram showing a circuit used in the system of the invention, in a particular embodiment.

FIG. 7 is a diagram of a particular embodiment of a circuit CT serving to impose predetermined states E1 and E2 on the user interface 20 as already described above with reference to FIG. 4.

In the presently described example, the circuit CT is contained in the peripheral device DV2. In a variant, at least a portion of this circuit CT may be arranged in the smartcard DV1.

As shown in FIG. 7, the circuit CT comprises two LEDs 20a and 20b together with a resistor R1. When the smartcard DV1 is coupled with the peripheral device DV2, the external contact C7 is connected to one of the terminals of the resistor R1. The two LEDs 20a and 20b are connected in series so that the LED 20a is connected to a ground terminal and the LED 20b is connected to a power supply terminal imposing a high level, written H (H=3 volts (V), for example). The second terminal of the resistor R1 is connected to the common terminals between the two LEDs 20a and 20b.

In this way, the smartcard DV1 is configured to use the external contact C7 to transmit to the peripheral device DV2 a control signal SG in the form of:
- a voltage of predetermined high level H, higher than ground, to switch on solely the first LED 20a from among the two LEDs (state E1 as described above with reference to FIG. 4); and
- a ground voltage to switch on solely the second LED 20b from among the two LEDs (state E2 as described above with reference to FIG. 4).

When no control signal SG is being sent (both LEDs 20a and 20b remain off, which corresponds to the rest state E0 as described above with reference to FIG. 4), the smartcard DV1 may for example impose a floating signal via the external contact C7, which signal is inherent to the system SY. This floating signal (of voltage lying between 0 and the level H) does not allow either the first LED 20a or the second LED 20b to be on.

As mentioned above, a series of control signals SG at a given transmission frequency may be transmitted by the smartcard DV1 to the peripheral device DV2 in order to force the user interface 20 to alternate in synchronous manner between two states (e.g. between E0 and E1, or between E0 and E2).

Furthermore, as mentioned above, each control signal SG of the invention is defined by a single level for an electrical characteristic. In the above-described embodiments of the invention, the control signals are defined by respective single voltage levels. In other words, it is the voltage level of the control signal that imposes a corresponding predefined state on the user interface. Nevertheless, it is possible to transmit control signals that are defined by respective single current levels or by respective single frequency levels.

Figure 8:
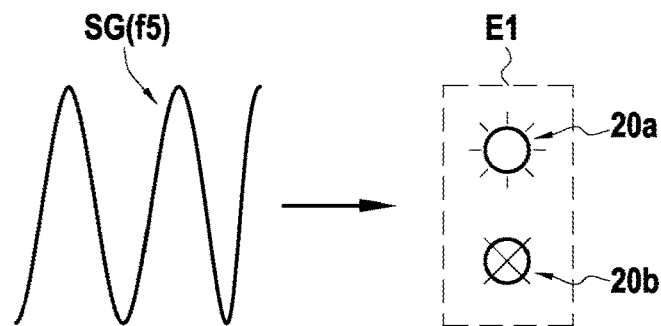
FIG. 8 is a diagram showing a configuration of control signals in a particular embodiment.
Figure 8:
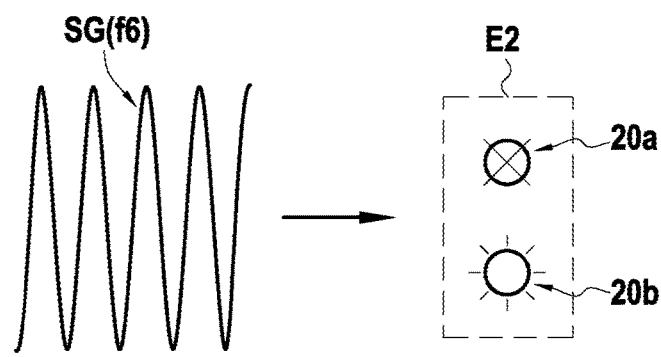

FIG. 8 is a diagram showing an example in which the control signals SG transmitted by the smartcard DV1 to the peripheral device in order to control the state of the user interface 20 are defined by their respective single frequency levels. As shown, a first control signal SG having a transmission frequency f5 may be transmitted by the smartcard DV1 to force the user interface 20 into the first state E1 in which the first indicator light 20a is on and the second indicator light is off. Likewise, a second control signal SG having a transmission frequency f6 may be transmitted by the smartcard DV1 to force the user interface 20 into the second state E2 in which the first indicator light 20a is off and the second indicator light is on. Nevertheless, other implementations are possible.

In the embodiments described in this document, the invention serves to capture a fingerprint of a user by means of a sensor embedded in a smartcard. It can be understood that the principle of the invention applies more generally to capturing any biometric print by using a biometric sensor embedded in a smartcard. Thus, by way of example, it is possible to acquire an electrocardiogram in accordance with the principle of the invention, by means of a sensor embedded in the smartcard.

A person skilled in the art understands that the above-described implementations and variants are no more than non-limiting examples of how the invention may be performed. In particular, the person skilled in the art can envisage any adaptation or combination of the above-described variants and implementations in order to satisfy any particular need.

The invention claimed is:

1. A system comprising a smartcard and a peripheral device configured to cooperate together to enable a biometric print to be acquired, the smartcard and the peripheral device being separate from each other;
    wherein the smartcard comprises:
        a biometric print sensor configured to acquire a biometric print;
        a processor; and
        a non-transitory computer memory storing instructions that when executed by the processor cause the processor to perform operations comprising:
            transmitting at least one control signal to the peripheral device to control the state of the peripheral device, each control signal being defined by a respective single electrical characteristic the single electrical characteristic being one of a single voltage level, a single current level, or a single frequency level, said single electrical characteristic being set by the processor to cause a predetermined information to be presented by the peripheral device;

wherein, the peripheral device comprises either passive components only, or comprises passive components only apart from at least one internal power supply, said passive components comprising:

a user interface comprising at least one indicator light, configured to put the at least one indicator light into a predetermined state in response to each received control signal, so as to guide a user in acquiring a biometric print by means of the biometric print sensor, wherein each control signal directly controls an on/off state of the at least one indicator light without any software interpretation of the control signal being performed by the peripheral device, and wherein in response to a series of first control signals received from the smart card, each of the first control signals presenting one of said single electrical characteristic, the at least one indicator light is forced to switch between a first predetermined state and a second predetermined state, thereby causing flashing of said at least one indicator light.

2. The system according to claim 1, wherein, in each predetermined state, the user interface is configured to present information appropriate for guiding the user in acquiring said biometric print by means of the biometric print sensor.

3. The system according to claim 1, wherein the peripheral device lacks any active processor means capable of interpreting any command coming from the smartcard.

4. The system according to claim 1, wherein the smartcard comprises:
a memory for storing said biometric print as a reference biometric print once it has been acquired by the biometric print sensor; and
wherein the operations further comprise:
authenticating said user by comparing the reference biometric print with another biometric print that is acquired subsequently.

5. The system according to claim 1, wherein the smartcard comprises:
a memory for storing said biometric print once it has been acquired by the biometric print sensor; and
wherein the operations further comprise:
authenticating said user by comparing the acquired biometric print with print data previously stored as a reference biometric print.

6. The system according to claim 1, wherein the peripheral device includes a battery for electrically powering the user interface.

7. The system according to claim 1, wherein the user interface is configured:
to switch between the first and second predetermined states at a first frequency in response to a series of first control signals received from the smartcard so as to indicate the start of a stage of acquiring a biometric print by means of the biometric print sensor;
to switch between the first and second predetermined states at a second frequency in response to a series of second control signals received from the smartcard so as to indicate that a biometric print is being acquired; and to put itself in a third predetermined state in response to a third control signal received from the smartcard so as to indicate that the stage of acquiring the biometric print has terminated;

wherein the first and second frequencies are distinct from each other, and the third control signal is distinct from the first and second control signals.

8. The system according to claim 1, wherein the at least one indicator light comprises a first LED and a second LED that are distinct from each other, wherein the operations further comprise: transmitting to the peripheral device, as control signals:
a ground voltage to switch on only the first LED among the two LEDs; or
a voltage at a predetermined high level, higher than the ground voltage, to switch on only the second LED among the two LEDs.

9. The system according to claim 1, wherein the smartcard is a card having external contacts in compliance with the ISO 7816 standard in order to transmit each control signal to the peripheral device by contact.

10. The system according to claim 9, wherein the smartcard is configured to transmit each control signal via the external contact C4, C6, or C8 according to the ISO 7816 standard.

11. The system according to claim 9, wherein the smartcard is configured to transmit each control signal via a contact from among the external contacts C2, C3, and C7 according to the ISO 7816 standard, wherein the smartcard is configured to switch between:
a first mode of operation in which the smartcard uses said one contact from among the external contacts C2, C3, and C7 according to the ISO 7816 standard in order to perform ISO 7816 type communication with an external terminal; and
a second mode of operation in which the smartcard uses said one contact from among the external contacts C2, C3, and C7 according to the the ISO 7816 standard for transmitting each control signal to the peripheral device;
the operations further comprising:
verifying, on starting of the smartcard, at least one signal level from among the signal RST detected on the external contact C2 according to ISO standard 7816, the signal CLK detected on the external contact C3 according to the ISO 7816 standard, and the power supply signal Vcc detected on the external contact C1 according to the ISO 7816 standard; and
switching the smartcard either into the first mode of operation or into the second mode of operation as a function of said at least one signal level detected from among the signal RST, the signal CLK, and the signal Vcc.

12. The system according to claim 1, wherein the smartcard is a payment card.

13. The system according to claim 1, wherein the peripheral device is a case into which the smartcard is inserted in order to enable said at least one control signal to be transmitted from the control module to the peripheral device.

14. A control method performed by a system comprising a smartcard and a peripheral device cooperating together to enable a biometric print to be acquired, the smartcard and the peripheral device being separate from each other;
the smartcard including a biometric print sensor and the peripheral device comprising either passive components only, or comprising passive components only apart from at least one internal power supply, said passive components comprising:

a user interface comprising at least one indicator light;

wherein the method comprises:

acquiring a biometric print by means of the biometric print sensor;

transmitting at least one control signal from the smartcard to the peripheral device to control the state of the peripheral device, each control signal being defined by a respective single electrical characteristic, the single electrical characteristic being one of a single voltage level, a single current level, or a single frequency level, said single electrical characteristic being set by the processor to cause a predetermined information to be presented by the peripheral device; and configuring the user interface into a predetermined state in response to each received control signal, so as to guide a user in acquiring a biometric print by means of the biometric print sensor;

wherein the configuring comprises:

controlling an on/off state of the at least one indicator light without any software interpretation of the control signal being performed by the peripheral device; and in response to a series of first control signals received from the smart card, each of the first signals presenting one of said single electrical characteristic, forcing the at least one indicator light to switch between a first predetermined state and a second predetermined state, thereby causing flashing of said at least one indicator light.

\* \* \* \* \*